(12) United States Patent
Maruoka et al.

(10) Patent No.: US 10,807,643 B2
(45) Date of Patent: Oct. 20, 2020

(54) PERIPHERAL MONITORING DEVICE

(71) Applicant: AISIN SEIKI KABUSHIKI KAISHA, Kariya-shi, Aichi-ken (JP)

(72) Inventors: Tetsuya Maruoka, Okazaki (JP); Kazuya Watanabe, Anjo (JP); Takayuki Nakasho, Anjo (JP); Masahiko Sakabe, Kariya (JP); Kazunori Ono, Tokai (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 16/485,941

(22) PCT Filed: Oct. 30, 2017

(86) PCT No.: PCT/JP2017/039162
§ 371 (c)(1),
(2) Date: Aug. 14, 2019

(87) PCT Pub. No.: WO2018/150642
PCT Pub. Date: Aug. 23, 2018

(65) Prior Publication Data
US 2020/0031398 A1 Jan. 30, 2020

(30) Foreign Application Priority Data
Feb. 16, 2017 (JP) ................ 2017-026541

(51) Int. Cl.
B62D 15/02 (2006.01)
B60R 1/00 (2006.01)
(Continued)

(52) U.S. Cl.
CPC ......... B62D 15/0295 (2013.01); B60R 1/003 (2013.01); H04N 5/272 (2013.01);
(Continued)

(58) Field of Classification Search
None
See application file for complete search history.

(56) References Cited

U.S. PATENT DOCUMENTS

2002/0145662 A1* 10/2002 Mizusawa ................ B60D 1/36
348/118
2008/0111669 A1 5/2008 Yamanaka et al.
(Continued)

FOREIGN PATENT DOCUMENTS

JP 2002-308029 A 10/2002
JP 2008-120293 A 5/2008
JP 2016-150616 A 8/2016

OTHER PUBLICATIONS

International Search Report for PCT/JP2017/039162 dated Jan. 9, 2018 [PCT/ISA/210].

Primary Examiner — Christopher Braniff
(74) Attorney, Agent, or Firm — Sughrue Mion, PLLC

(57) ABSTRACT

A peripheral monitoring device according to an embodiment includes an acquirer configured to acquire a first image generated by an imaging device, and acquire a steering angle of a vehicle, the imaging device that images an area behind the vehicle; a calculator configured to calculate an estimate of trajectory of a first coupling device from the steering angle, the first coupling device being mounted on the vehicle to couple the vehicle to a towed vehicle; and an output configured to display the first image on a display screen for use in an interior of the vehicle and to superimpose a second image on the first image on the display screen. The second image is of a linear shape representing the estimate of trajectory. The linear shape widens continuously or in stages as being away from a vehicle-side end.

7 Claims, 15 Drawing Sheets

(51) Int. Cl.
*H04N 5/272* (2006.01)
*H04N 7/18* (2006.01)

(52) U.S. Cl.
CPC .......... *H04N 7/183* (2013.01); *B60R 2300/10* (2013.01); *B60R 2300/20* (2013.01); *B60R 2300/305* (2013.01); *B60R 2300/808* (2013.01); *B60R 2300/8086* (2013.01)

(56) References Cited

U.S. PATENT DOCUMENTS

2011/0013019 A1 1/2011 Yamanaka et al.
2018/0061102 A1* 3/2018 Goto ........................ G06T 11/60

* cited by examiner

PERIPHERAL MONITORING DEVICE

CROSS-REFERENCE TO RELATED APPLICATIONS

This application is national stage application of International Application No. PCT/JP2017/039162, filed Oct. 30, 2017, which designates the United States, incorporated herein by reference, and which claims the benefit of priority from Japanese Patent Application No. 2017-026541, filed Feb. 16, 2017, the entire contents of which are incorporated herein by reference.

TECHNICAL FIELD

Embodiments of the present invention relates generally to a peripheral monitoring device.

BACKGROUND ART

Conventionally, techniques are known, which image surrounding environment around a vehicle with an imaging device installed in the vehicle to provide the driver with generated images via a display screen provided in a vehicle interior. For coupling the vehicle to a trailer (as a towed vehicle), the driver can make use of the image displayed on the display screen to check the positional relation between the vehicle and the trailer.

CITATION LIST

Patent Literature

Patent Document 1: Japanese Laid-open Patent Application No. 2002-308029
Patent Document 2: Japanese Laid-open Patent Application No. 2008-120293

SUMMARY OF INVENTION

Problem to be Solved by the Invention

In a trailer coupling operation, the driver moves the vehicle to adjust positions of a coupling device of the vehicle and a coupling device of the trailer. In a short distance between the vehicle and the trailer, the driver is required to accurately steer for position adjustment of the two devices. However, in a longer distance between the vehicle and the trailer, the driver can adjust a vehicle's course while driving rearward, which does not require such accurate steering for position adjustment.

It is an object of the present invention to provide a peripheral monitoring device that assists a driver of a vehicle in coupling the vehicle to a towed vehicle with as a reduced load as possible.

Means for Solving Problem

According to one embodiment of the present invention, as an example, a peripheral monitoring device includes an acquirer configured to acquire a first image generated by an imaging device, and acquire a steering angle of a vehicle, the imaging device that images an area behind the vehicle; a calculator configured to calculate an estimate of trajectory of a first coupling device from the steering angle, the first coupling device being mounted on the vehicle to couple the vehicle to a towed vehicle; and an output configured to display the first image on a display screen for use in an interior of the vehicle and to superimpose a second image on the first image on the display screen, the second image being of a linear shape representing the estimate of trajectory, the linear shape that widens continuously or in stages as being away from a vehicle-side end.

This, for example, allows the driver to easily adjust the position of the line-shaped second image and a displayed position of the coupling device of the towed vehicle without the necessity for accurate steering from a sufficiently long distance between the vehicle and the towed vehicle. This can reduce a driver's load.

In the peripheral monitoring device according to one embodiment of the present invention, as an example, the output blinks an end of the second image on display, the end being opposite to the vehicle-side end.

This, for example, improves the visibility of the second image representing the estimate of trajectory.

In the peripheral monitoring device according to one embodiment of the present invention, as an example, the acquirer further acquires a distance between the vehicle and the towed vehicle. When the distance is larger than a threshold, the output decreases transparency of the second image continuously or in stages such that the further from the vehicle-side end the second image is, the lower the transparency set to the second image is, and when the distance is smaller than the threshold, the output sets same transparency at each position of the second image.

Thus, by setting the transparency to a sufficiently large value when the distance between the vehicles is smaller than the threshold, for example, it is made possible to improve the visibility of the coupling device of the vehicle and the coupling device of the towed vehicle on the display screen.

In the peripheral monitoring device according to one embodiment of the present invention, as an example, the imaging device is placed at an offset position from the first coupling device in a lateral direction of the vehicle. The output superimposes identification information on the first image on display at an at least laterally offset position from a displayed position of the first coupling device, the identification information indicating a target position of a second coupling device mounted on the towed vehicle.

This makes it possible for the driver to more accurately move the vehicle to a position in which the first coupling device and the second coupling device can be coupled together, for example.

In the peripheral monitoring device according to one embodiment of the present invention, as an example, the acquirer further acquires width information input from an occupant. The output sets a rate of change in width of the second image in accordance with the width information.

This makes it possible for the driver to optionally set the rate of change in width in accordance with his or her preference or driving skills, for example.

DESCRIPTION OF EMBODIMENTS

First Embodiment

A vehicle 1 according to embodiments of the present invention may be, for example, an internal combustion engine automobile including an internal combustion engine (not illustrated) as its power source, an electric automobile or a fuel cell automobile including a motor (not illustrated) as its power source, a hybrid automobile including both internal combustion engine and motor as its power source, or an automobile including any other power sources. The vehicle 1 can include various types of transmission devices and can include various devices, or specifically, systems and components, necessary to drive the internal combustion engine or the motor. The types, number, and layout of devices for driving wheels 3 of the vehicle 1 can be set in various ways.

Figure 1:
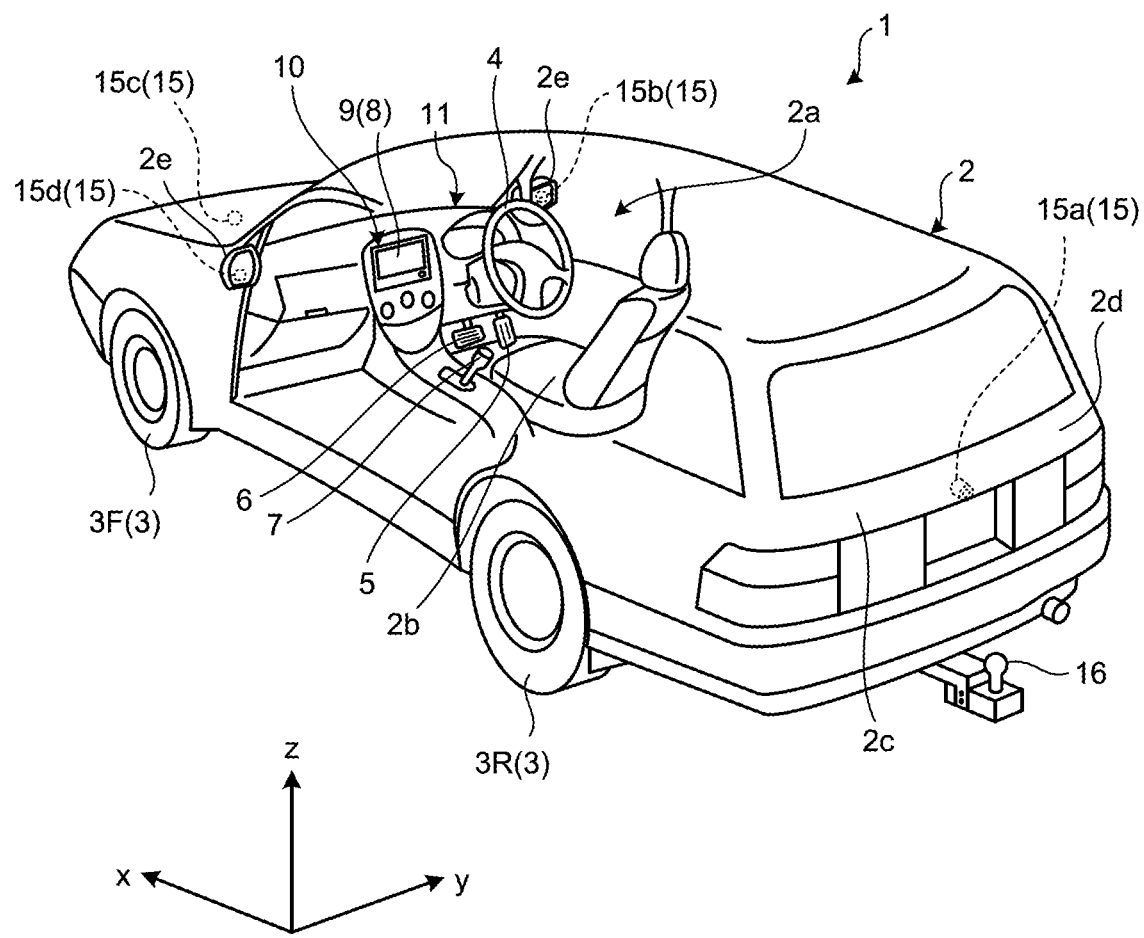
FIG. 1 is a perspective view illustrating an example of a vehicle including a peripheral monitoring device according to a first embodiment of the present invention with a vehicle interior partially seen through the vehicle.
Figure 2:
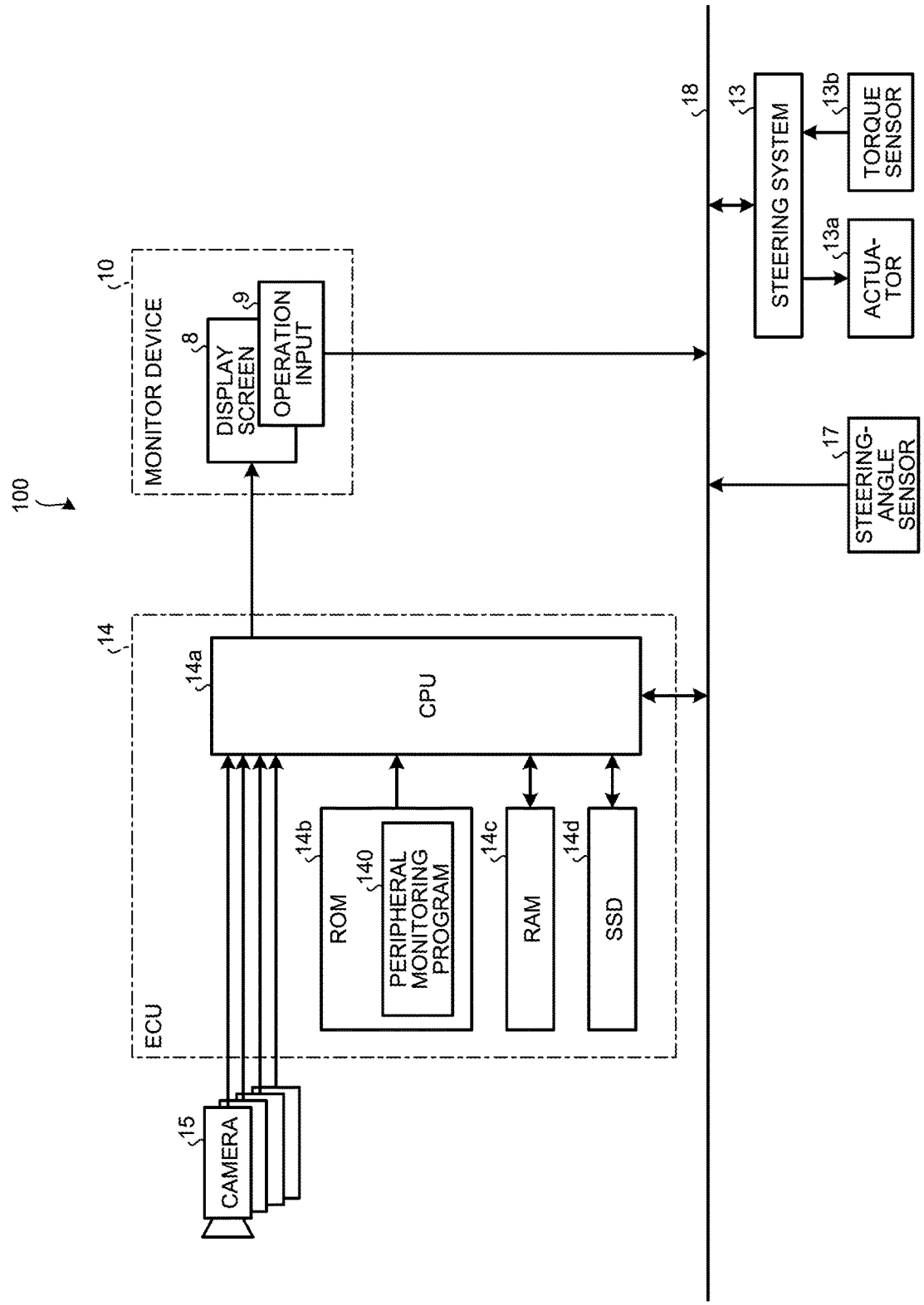
FIG. 2 is a diagram illustrating a configuration of a peripheral monitoring system installed in the vehicle according to the first embodiment.

FIG. 1 is a perspective view illustrating an example of the vehicle 1 including a peripheral monitoring device according to a first embodiment of the present invention with a vehicle interior 2a partially seen through the vehicle 1. FIG. 1 and some other drawings include coordinate axes. The coordinate axes include an x-axis, a y-axis, and a z-axis. The x-axis corresponds to the longitudinal direction of the vehicle 1 with the direction toward the front of the vehicle 1 defined as the positive direction. The y-axis corresponds to the lateral direction of the vehicle 1 with the direction toward the right of the vehicle 1 defined as positive direction. The z-axis corresponds to the vertical direction of the vehicle 1 with the direction toward the upper side of the vehicle 1 defined as positive direction. FIG. 2 is a diagram illustrating the configuration of a peripheral monitoring system 100 installed in the vehicle 1 according to the first embodiment.

As illustrated in FIG. 1, a vehicle body 2 defines the vehicle interior 2a in which occupants (not illustrated) ride. Inside the vehicle interior 2a, for example, a steering 4, an acceleration unit 5, a braking unit 6, and a transmission 7 are disposed, facing a seat 2b for a driver as an occupant. The steering 4 is, for example, a steering wheel projecting from a dashboard 11. The acceleration unit 5 is, for example, an accelerator pedal at the feet of the driver. The braking unit 6 is, for example, a brake pedal at the feet of the driver. The transmission 7 is, for example, a gear lever projecting from a center console. Components such as the steering 4, the acceleration unit 5, the braking unit 6, and the transmission 7 are not limited to the examples above.

The vehicle interior 2a is provided with a display screen 8. In other words, the display screen 8 is for use in the vehicle 1. The display screen 8 represents, for example, a liquid crystal display (LCD) or an organic electroluminescent display (OELD). The display screen 8 is, for example, covered with a transparent operation input 9 such as a touch panel. Occupants can view images on the display screen 8 through the operation input 9. The occupants can input operations through the operation input 9 with, for example, their fingers by touching, tapping, or flicking a position corresponding to an image displayed on the display screen 8. Devices such as the display screen 8 and the operation input 9 are included in, for example, a monitor device 10 disposed at a lateral or horizontal center of the dashboard 11. The monitor device 10 can further include operation inputs (not illustrated) such as a switch, a dial, a joystick, or push buttons. The monitor device 10 may be used for, for example, both of a navigation system and an audio system.

As illustrated in FIG. 1, the vehicle 1 is, for example, a four-wheel vehicle. The vehicle 1 includes two left and right front wheels 3F and two left and right rear wheels 3R. Optionally, these four wheels 3 may be configured as steerable wheels. As illustrated in FIG. 2, the vehicle 1 includes a steering system 13 for steering at least two wheels 3. The steering system 13 includes an actuator 13a and a torque sensor 13b. The steering system 13 is electrically controlled by, for example, an electronic control unit (ECU) 14 to operate the actuator 13a. The steering system 13 is, for example, an electric power steering system or a steer-by-wire (SBW) system. The steering system 13 causes the actuator 13a to add torque, or specifically, assist torque, to the steering 4 to augment the steering force and causes the actuator 13a to turn the wheels 3.

As illustrated in FIG. 1, the vehicle 1 is equipped with a hitch ball 16 in the rear. The hitch ball 16 represents a coupling device for coupling the vehicle 1 to a trailer to be towed.

Figure 3:
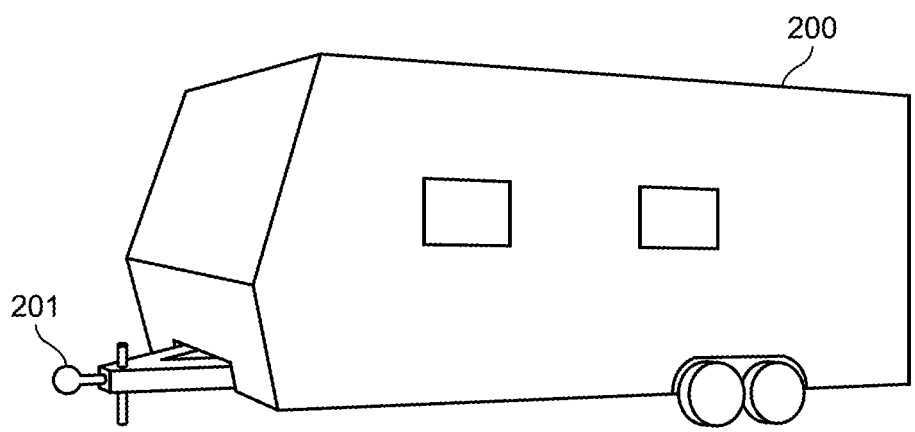
FIG. 3 is a diagram illustrating an exemplary trailer.

FIG. 3 is a diagram illustrating an exemplary trailer 200 to be towed. In this example, the trailer 200 is a camping trailer, but the trailer 200 to be towed is not limited to the camping trailer. The trailer 200 includes a hitch coupler 201 at the front end. The hitch coupler 201 is a coupling device of the trailer 200 and is designed to be coupled with the hitch ball 16. In a coupling operation, the vehicle 1 is moved to a position at which the hitch ball 16 comes immediately below the hitch coupler 201, to couple the hitch ball 16 and the hitch coupler 201 together.

The hitch ball 16 and the hitch coupler 201 are an exemplary combination of coupling devices. Optionally, for example, a combination of a fifth wheel and a king pin or any other combinations of coupling devices may be used.

As illustrated in FIG. 1, a plurality of cameras 15 such as four cameras 15a to 15d is mounted on the vehicle body 2. The cameras 15 are, for example, imaging devices each incorporating an image sensor such as a charge-coupled device (CCD) or a complementary metal-oxide semiconductor (CMOS) image sensor. The cameras 15 can output images at a certain frame rate. The cameras 15 each include a wide-angle lens or a fish-eye lens, and can generate an image in the horizontal range of 140 to 220 degrees. The cameras 15 sequentially generate images of the surrounding environment around the vehicle 1 for output.

Figure 4:
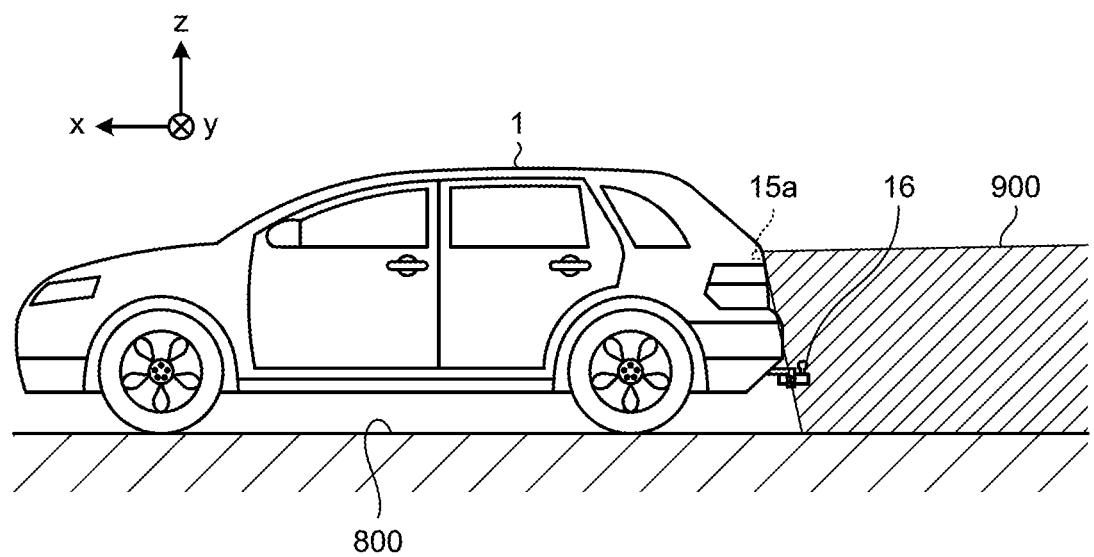
FIG. 4 is a diagram illustrating an exemplary image-imaging range of a camera according to the first embodiment.

The camera 15a is disposed at, for example, a rear end 2c of the vehicle body 2 on a wall below a rear window of a rear hatch door 2d. As illustrated in FIG. 4, the optical axis of the camera 15a is set slightly downward toward a road surface 800 relative to the horizontal direction so that the hitch ball 16 is included in an imaging region 900 of the camera 15a. The camera 15b is mounted on, for example, a right-side side mirror 2e of the vehicle body 2. The camera 15c is mounted on, for example, the front of the vehicle body 2 in the longitudinal direction, such as a front bumper or a grille. The camera 15d is mounted on, for example, a left-side side mirror 2e of the vehicle body 2.

As illustrated in FIG. 2, the peripheral monitoring system 100 includes, for example, the monitor device 10, the steering system 13, the ECU 14, and a steering-angle sensor 17. The monitor device 10, the steering system 13, the ECU 14, and the steering-angle sensor 17 are connected to an on-board network 18 that is telecommunication circuitry. The on-board network 18 is configured as, for example, a controller area network (CAN). The ECU 14 sends control signals via the on-board network 18 to control, for example, the steering system 13. The ECU 14 can receive sensor values of the sensors such as the torque sensor 13b and the steering-angle sensor 17 and operational information input through, for example, the operation input 9 via the on-board network 18.

The steering-angle sensor 17 detects, for example, an amount of steering on the steering 4 such as the steering wheel. The ECU 14 acquires an amount of steering on the steering 4 by the driver or, in an autonomous steering mode, an amount of steering of the wheels 3, from the steering-angle sensor 17 as steering information for use in various types of controls.

The ECU 14 is an example of the peripheral monitoring device. The ECU 14 includes, for example, a central processing unit (CPU) 14a, a read only memory (ROM) 14b, a random access memory (RAM) 14c, and a solid state drive (SSD) 14d. The CPU 14a is a computation unit and the ROM 14b, the RAM 14c, and the SSD 14d are storage devices. In other words, the ECU 14 has a hardware configuration of a computer. The ECU 14 may be configured of a plurality of computers.

The CPU 14a executes a peripheral monitoring program 140 installed and stored in the ROM 14b to implement the functions of the peripheral monitoring device. The peripheral monitoring program 140 may be installed in the SSD 14d instead of the ROM 14b. The RAM 14c temporarily stores therein various types of data for use in calculation by the CPU 14a. The SSD 14d is a rewritable non-volatile storage device that can retain data after the ECU 14 is powered off. Devices such as the CPU 14a, the ROM 14b, and the RAM 14c may be integrated in a single package. Instead of the CPU 14a, the ECU 14 may include a digital signal processor (DSP) or other logical operation processors or logical circuits. Instead of the SSD 14d, the ECU 14 may include a hard disk drive (HDD). The SSD 14d or the HDD may be separately provided from the ECU 14.

The peripheral monitoring program 140 may be recorded and provided in an installable or executable file format on a computer-readable recording medium such as a compact disc read only memory (CD-ROM), a flexible disk (FD), a compact disc recordable (CD-R), a digital versatile disc (DVD), and a flash memory.

The peripheral monitoring program 140 may be stored in a computer connected to a network such as the Internet and provided by being downloaded via the network. The peripheral monitoring program 140 may be provided or distributed via a network such as the Internet.

The ECU 14 performs computation or image processing to the images generated by the cameras 15, thereby generating a wider-angle image or a virtual bird's eye view image of the vehicle 1 seen from above. The ECU 14 performs computation or image processing to wide-angle image data generated by a camera 15 to generate a partially cut-out image of a specific region, generate an image representing only a specific region, or generate an image including a specific region in highlight. The ECU 14 can transform (perform view-point transformation on) an image into a virtual image from a point of view (virtual point of view) different from the point of view of the camera 15. By display of the image on the display screen 8, the ECU 14 can provide the driver with peripheral monitoring information to enable the driver to make a safety check of the right side or the left side of the vehicle 1 or around the vehicle 1 through the bird's eye view, for example. During rearward movement of the vehicle 1, the ECU 14 displays an image of the rearward environment of the vehicle 1 on the display screen 8 on the basis of the image generated by the camera 15a. The display mode of an image of the rearward environment of the vehicle 1 on the display screen 8 is referred to as a rear-view mode. The image generated by the camera 15a is referred to as a rear image.

In coupling the vehicle 1 to the trailer 200, the driver first moves the vehicle 1 to a position at which the rear of the vehicle 1 is substantially in front of the trailer 200 and then moves the vehicle 1 backward to a position at which the hitch ball 16 and the hitch coupler 201 can be coupled together. During backward movement of the vehicle 1, the ECU 14 as the peripheral monitoring device according to the first embodiment superimposes a trajectory image on the rear image and displays the superimposed image on the display screen 8. The trajectory image is a line-shaped image representing an estimated trajectory of the hitch ball 16. The estimated trajectory of the hitch ball 16 represents a course to be followed by the hitch ball 16 at the time of moving backward at the current steering angle.

Figure 5:
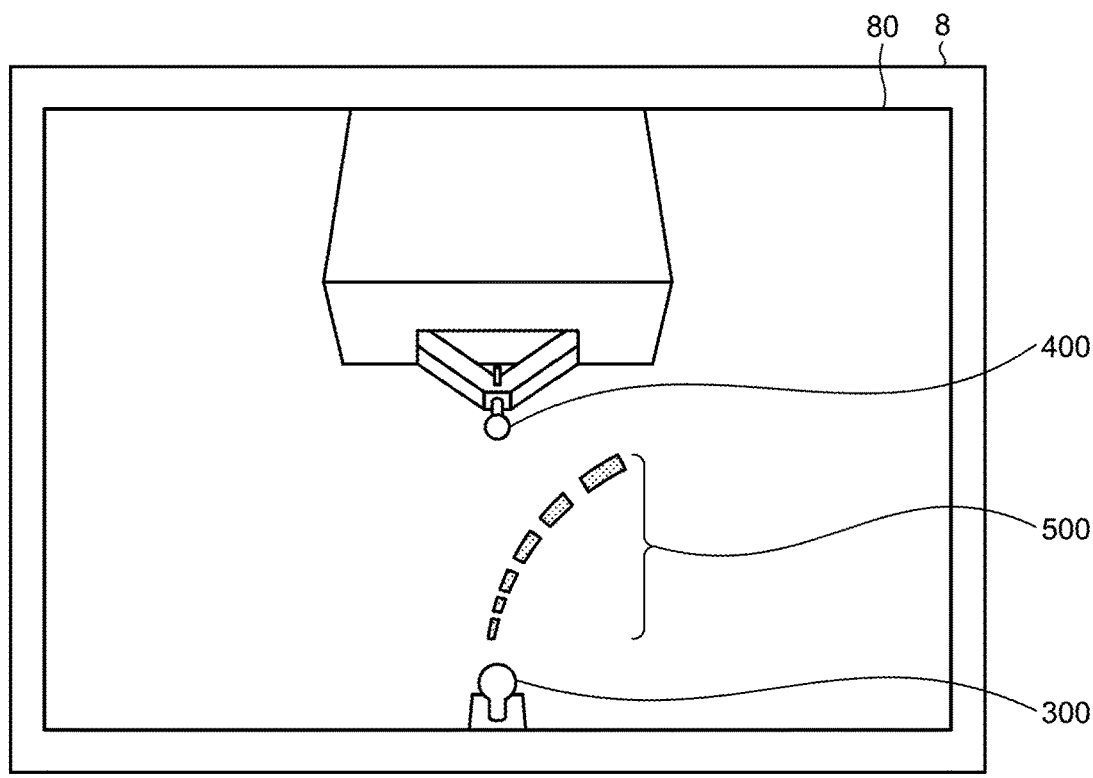
FIG. 5 is a diagram illustrating a display example of the peripheral monitoring device according to the first embodiment.

FIG. 5 is a diagram illustrating a display example of the peripheral monitoring device according to the first embodiment. As illustrated in FIG. 5, the display screen 8 displays a rear image including an image 300 of the hitch ball 16 and an image 400 of the hitch coupler 201 in a display region 80. The lower side of the rear image in FIG. 5 corresponds to a vehicle 1 side. A trajectory image 500 illustrated by a dashed line is superimposed on the rear image. The trajectory image 500 changes substantially in real time in accordance with the steering angle. The driver operates the steering 4 so that the trajectory image 500 and the image 400 of the hitch coupler 201 are overlaid on each other, and drives the vehicle 1 backward, with the trajectory image 500 overlaid on the image 400 of the hitch coupler 201, to the position at which the hitch ball 16 and the hitch coupler 201 can be coupled together.

The trajectory image 500 widens as is away from the vehicle-1-side end. In a close distance between the vehicle 1 and the trailer 200, the driver naturally performs accurate steering to overlay a narrow part of the trajectory image 500 onto the image 400 of the hitch coupler 201. In a sufficiently long distance between the vehicle 1 and the trailer 200, the driver is to overlay a wider part of the trajectory image 500 onto the image of the hitch coupler 201. It is easy to overlay the trajectory image 500 onto the image 400 of the hitch coupler 201. In other words, this eliminates the need for the driver to accurately steer from a sufficiently long distance between the vehicle 1 and the trailer 200. This can reduce a driver's load.

Figure 6:
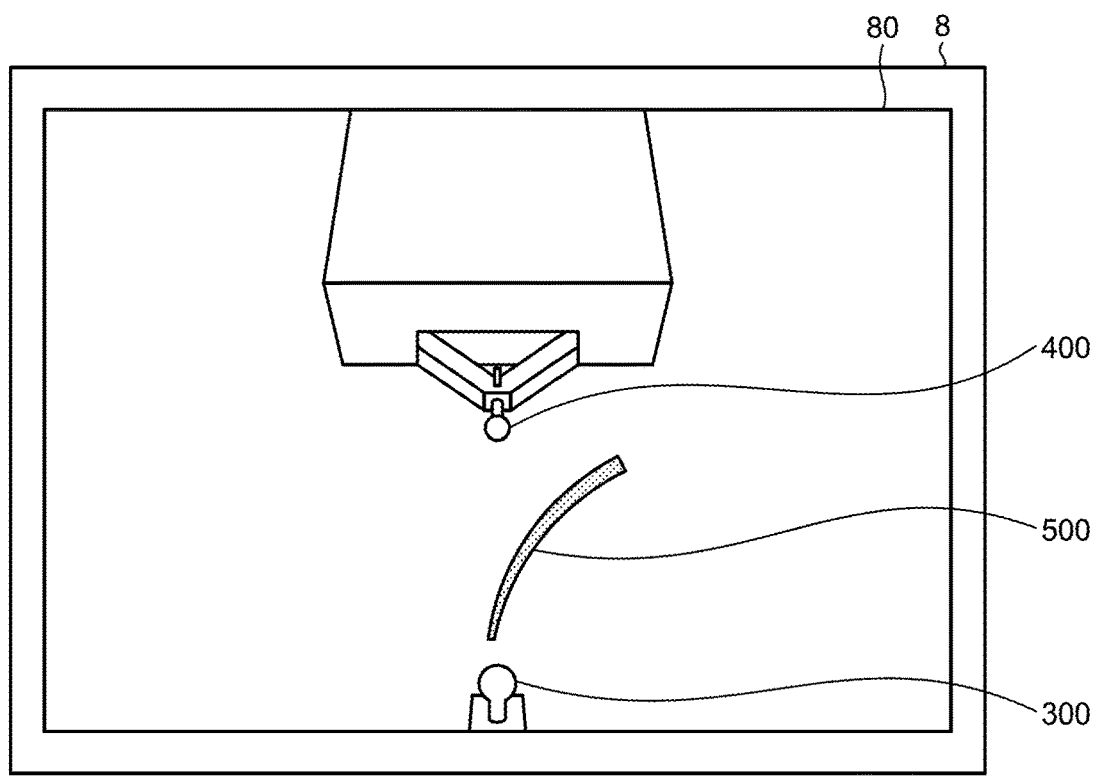
FIG. 6 is a diagram illustrating a display example of the peripheral monitoring device according to the first embodiment.

The linear trajectory image 500 is not limited to the dashed line. As illustrated in FIG. 6, the trajectory image 500 may be a solid line. The trajectory image 500 may widen continuously or in stages as is away from the vehicle-1-side end.

Figure 7:
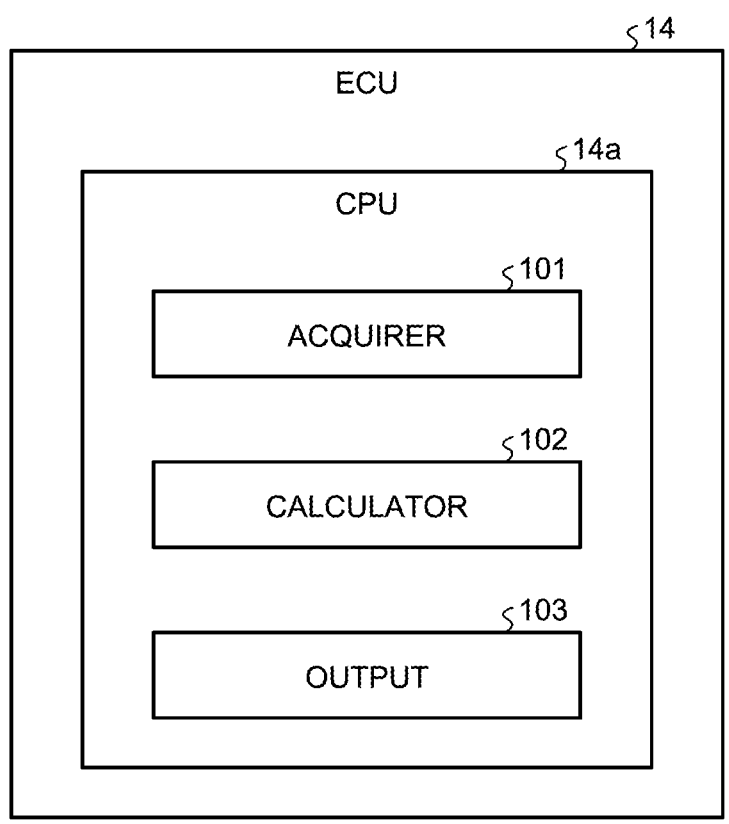
FIG. 7 is a block diagram illustrating a functional configuration of the peripheral monitoring device according to the first embodiment.

FIG. 7 is a block diagram illustrating a functional configuration of the ECU 14 as the peripheral monitoring device according to the first embodiment. The ECU 14 functions as an acquirer 101, a calculator 102, and an output 103. The CPU 14*a* reads and executes the peripheral monitoring program 140 from the ROM 14*b* to implement the functions of the acquirer 101, the calculator 102, and the output 103.

The acquirer 101 acquires images from the cameras 15. Specifically, the acquirer 101 acquires a rear image from the camera 15*a* in the rear-view mode.

The acquirer 101 acquires steering information from the steering-angle sensor 17.

The calculator 102 calculates an estimate of trajectory of the hitch ball 16 in accordance with the steering information. The method of calculating the estimate of the trajectory of the hitch ball 16 is not limited to a specific method.

Figure 8:
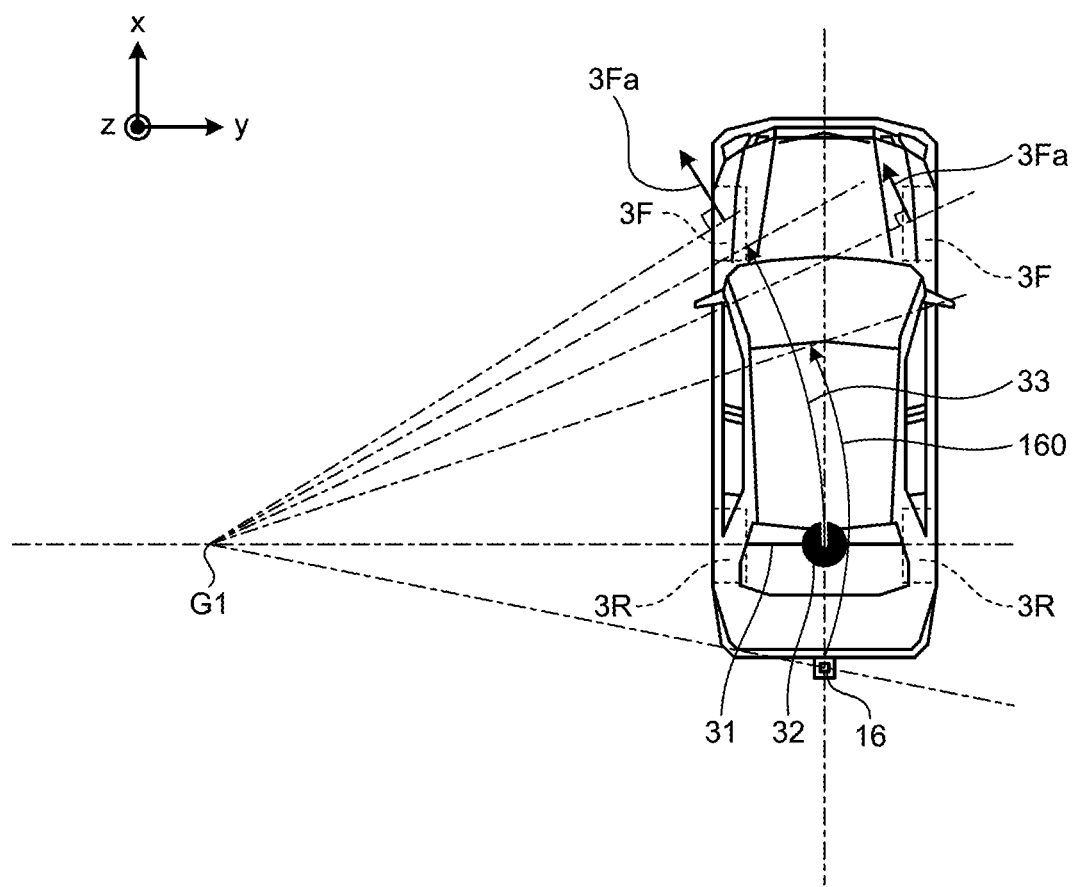
FIG. 8 is a diagram illustrating a method of calculating an estimate of trajectory of a hitch ball according to the first embodiment.

FIG. 8 is a diagram illustrating an exemplary method of calculating the estimate of trajectory of the hitch ball 16. When the driver operates the steering 4 to change the angles of the front wheels 3F, a turning center G1 of the vehicle 1 will be at intersection of directions orthogonal to directions 3Fa of the front wheels 3F and an extending direction of a rear axle 31 supporting the rear wheels 3R. That is, along with turning of the vehicle 1 in accordance with the angles of the front wheels 3F, a center 32 of the rear axle 31 moves following an arc 33 about the turning center G1. Since the position of the hitch ball 16 relative to the vehicle 1 is fixed, the hitch ball 16 also moves, following an arc about the turning center G1. While the vehicle 1 turns in a normal driving state condition with, for example, no slipping, the trajectory of the hitch ball 16 is uniquely determined from the angles of the front wheels 3F. For example, the calculator 102 calculates the angles of the front wheels 3F from the steering information. The calculator 102 then calculates the turning center G1 from the angles of the front wheels 3F to find a trajectory 160 (estimate of trajectory) of the hitch ball 16 about the turning center G1.

An occupant inputs the position of the hitch ball 16 relative to the vehicle 1 with the operation input 9, for example. For example, the acquirer 101 acquires numerical information, such as an amount of projection from the rear end of the vehicle 1 and the height from the road surface 800 through the operation input 9. The calculator 102 then calculates the position of the hitch ball 16 relative to the vehicle 1 from the input numerical information.

If the rear wheels 3R are steerable by active rear steering system (ARS) included in the vehicle, for example, the calculator 102 may optionally calculate the estimate of trajectory of the hitch ball 16 in consideration of the angles of the rear wheels 3R.

The length of the estimated trajectory may be set to any value. The estimated trajectory may be set in advance to, for example, three meters. The length of the estimated trajectory may be changeable by an occupant.

The output 103 superimposes the trajectory image 500 representing the estimated trajectory of the hitch ball 16 on the rear image and displays the rear image on which the trajectory image 500 is superimposed on the display screen 8. The method of generating the trajectory image 500 is not limited to a specific method.

Figure 9:
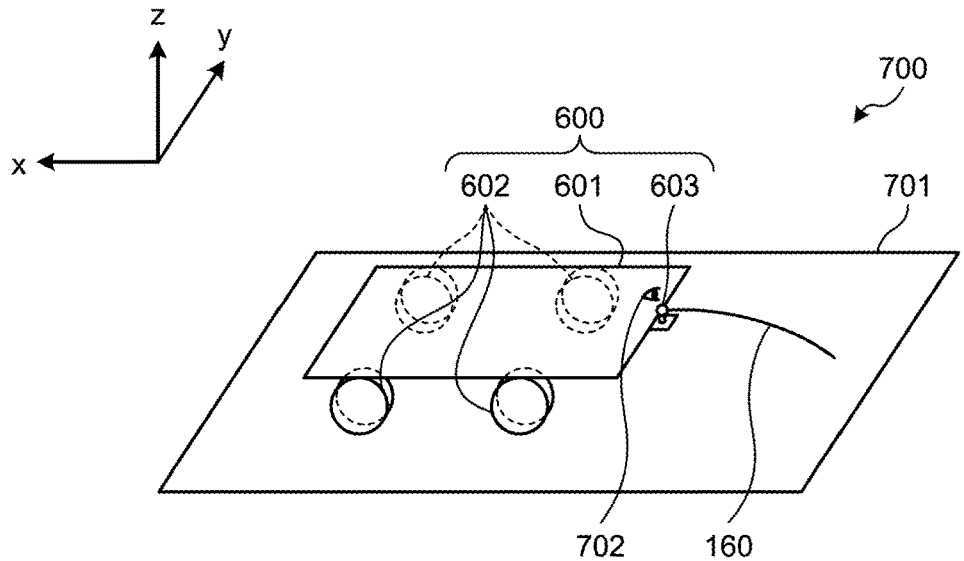
FIG. 9 is a diagram illustrating a method of generating a trajectory image according to the first embodiment.

FIG. 9 is a diagram illustrating an exemplary method of generating the trajectory image 500. First, the output 103 sets a virtual road surface 701, a virtual point of view 702, and a trajectory 160 being the estimated trajectory of the hitch ball 16 in a virtual space 700. In FIG. 9, for simple explanation, a model 600 of the vehicle 1 including a model 601 of the vehicle body 2, models 602 of the wheels 3, and a model 603 of the hitch ball 16 is set in the virtual space 700. The virtual point of view 702 is set corresponding to the position of the camera 15*a*. The direction and angle of the optical axis of the virtual point of view 702 correspond to the direction and angle of the optical axis of the camera 15*a*. The trajectory 160 has an arc shape extending from the position of the model 603 of the hitch ball 16. The output 103 calculates the estimate of trajectory as seen from the camera 15*a* through perspective projection of the trajectory 160 onto a two-dimensional image as seen from the virtual point of view 702 with. The output 103 generates an image (trajectory image 500) of a shape of the estimated trajectory, as seen from the camera 15*a*, which widens as being away from the vehicle 1. The output 103 then superimposes the generated trajectory image 500 on the rear image.

Figure 10:
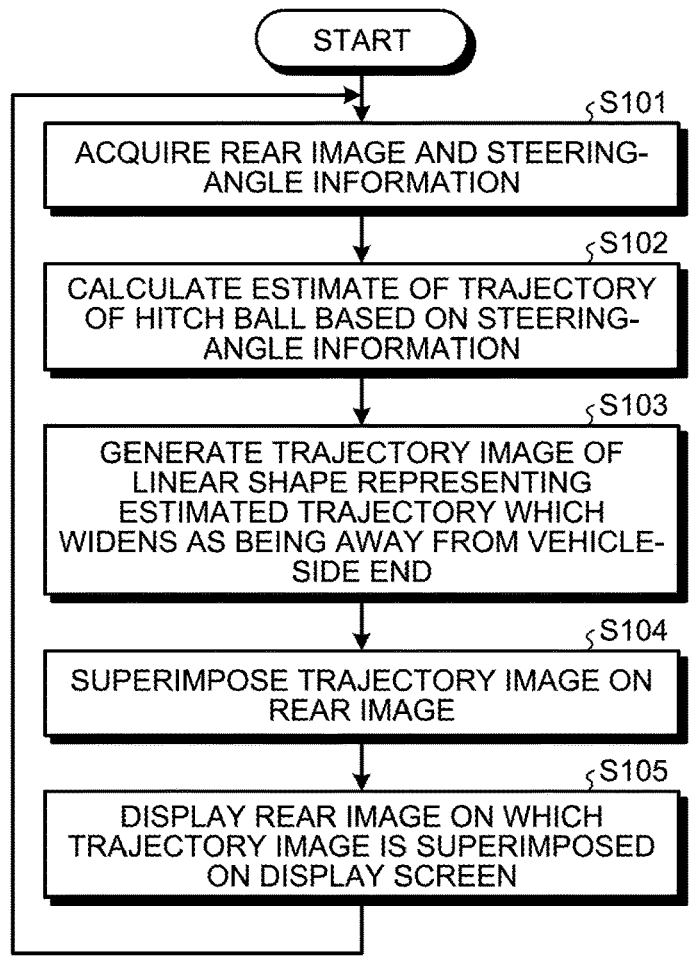
FIG. 10 is a flowchart illustrating the operation of the peripheral monitoring device according to the first embodiment.

FIG. 10 is a flowchart illustrating the operation of the ECU 14 as the peripheral monitoring device according to the first embodiment. This flowchart illustrates the operation in the rear-view mode alone. Operations from S101 to S105 are a loop operation and are repeated at a certain control cycle.

First, the ECU 14 acquires a rear image from the camera 15*a* and the steering-angle information from the steering-angle sensor 17 (S101). The calculator 102 calculates an estimate of trajectory of the hitch ball 16 in accordance with the steering-angle information by, for example, the method described above (S102). The output 103 generates the trajectory image 500 representing the estimated trajectory by, for example, the above method (S103). The trajectory image 500 widens as is away from the vehicle-1-side end. The output 103 superimposes the trajectory image 500 on the rear image (S104), and displays the rear image on which the trajectory image 500 is superimposed on the display screen 8 (S105). After S105, the control returns to S101.

The operation from S101 to S105 may be designed to start or end at any timing. For example, the ECU 14 starts the operation from S101 to S105 in response to the driver's setting the transmission 7 in reverse gear. For example, the ECU 14 ends the operation from S101 to S105 in response to the driver's changing the transmission 7 from reverse gear to another gear.

As described above, according to the first embodiment, the calculator 102 calculates the estimate of trajectory of the hitch ball 16 in accordance with the steering-angle information. The output 103 superimposes the trajectory image 500 representing the estimated trajectory on the rear image, and displays the rear image on which the trajectory image 500 is superimposed on the display screen 8. The trajectory image 500 widens continuously or in stages as is away from the vehicle-1-side end.

Thus, the driver can place the trajectory image 500 the image 400 of the hitch coupler 201 on the top of each other, without accurately steering from a sufficiently long distance between the vehicle 1 and the trailer 200. This can reduce the driver's load.

Figure 11:
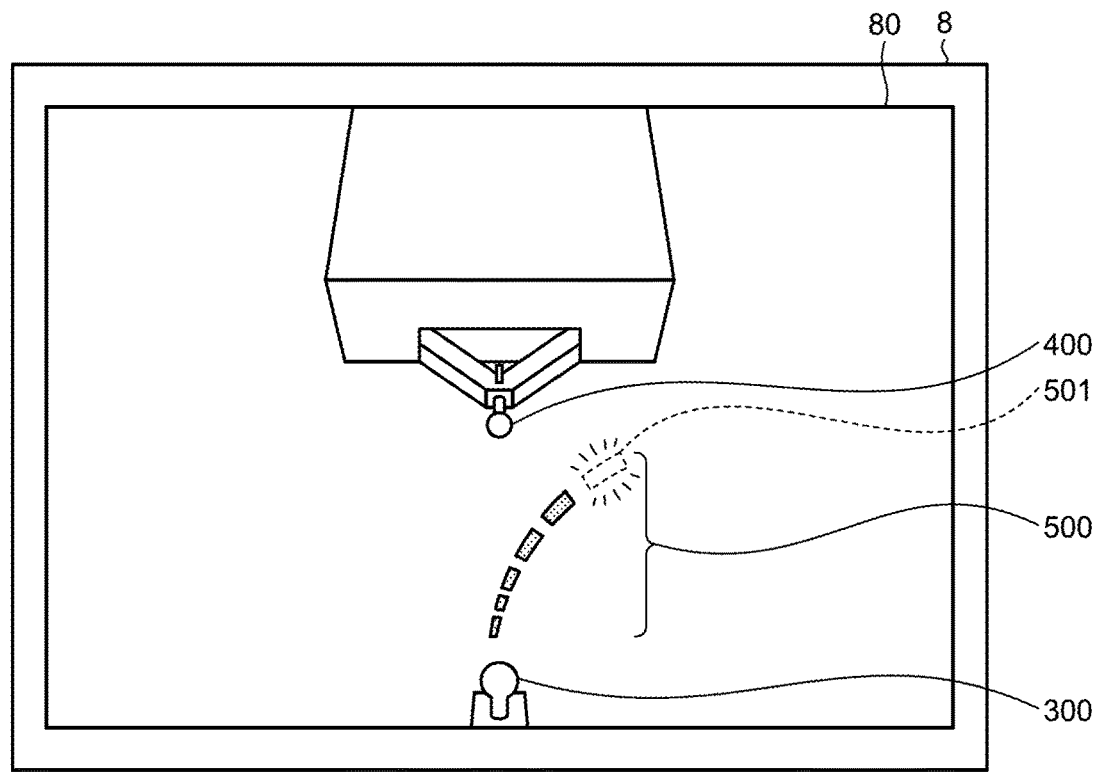
FIG. 11 is a diagram illustrating a display example of the peripheral monitoring device according to the first embodiment.

As illustrated in FIG. 11, the output 103 may optionally blinks an opposite end 501 of the trajectory image 500. The end 501 is opposite the vehicle-1-side end. In the case of the trajectory image 500 represented by a solid line, the output 103 may also blink only the opposite end the trajectory image 500 on display. Blinking a wider part of the trajectory image 500 can increase the visibility of the trajectory image 500.

The acquirer 101 may optionally acquire width information input by an occupant. The output 103 may optionally set the rate of change in width of the trajectory image 500 in accordance with the width information.

Figure 12:
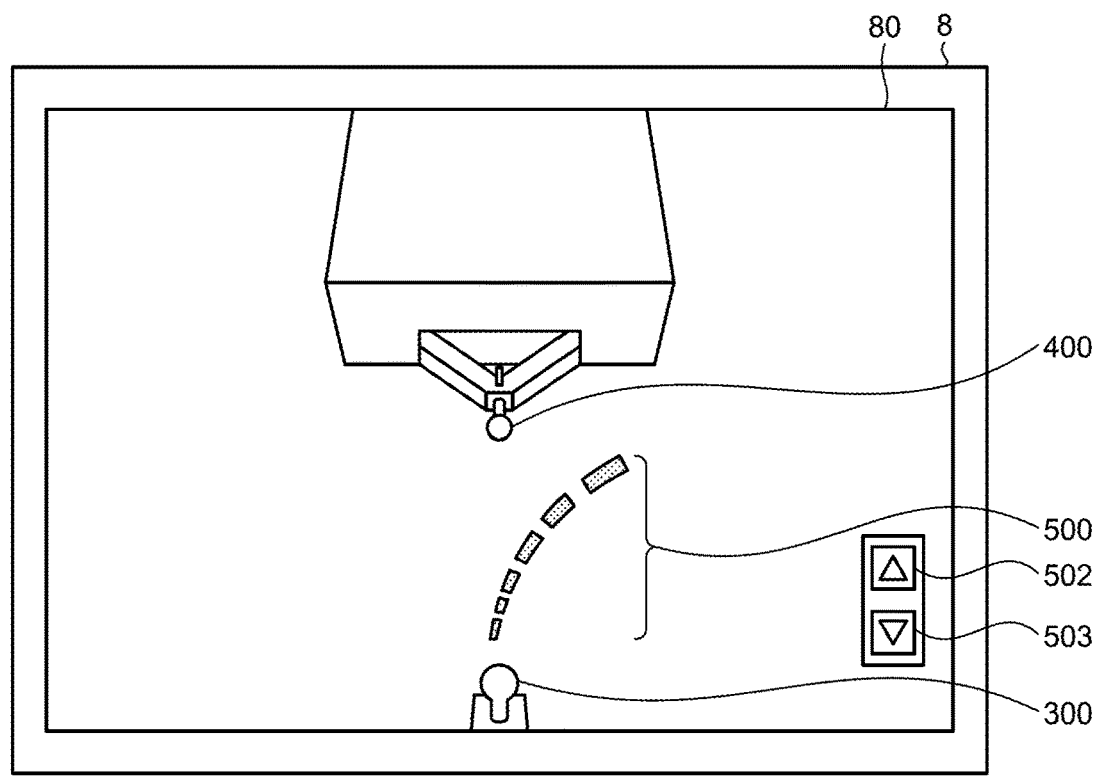
FIG. 12 is a diagram illustrating a display example of the peripheral monitoring device according to the first embodiment.

As illustrated in FIG. 12, for example, the output 103 displays a button 502 for increasing the rate of change in width and a button 503 for decreasing the rate of change in width. Touch inputs to the button 502 and the button 503 are detected by the operation input 9 and acquired by the acquirer 101 as an input of width information.

Figure 13:
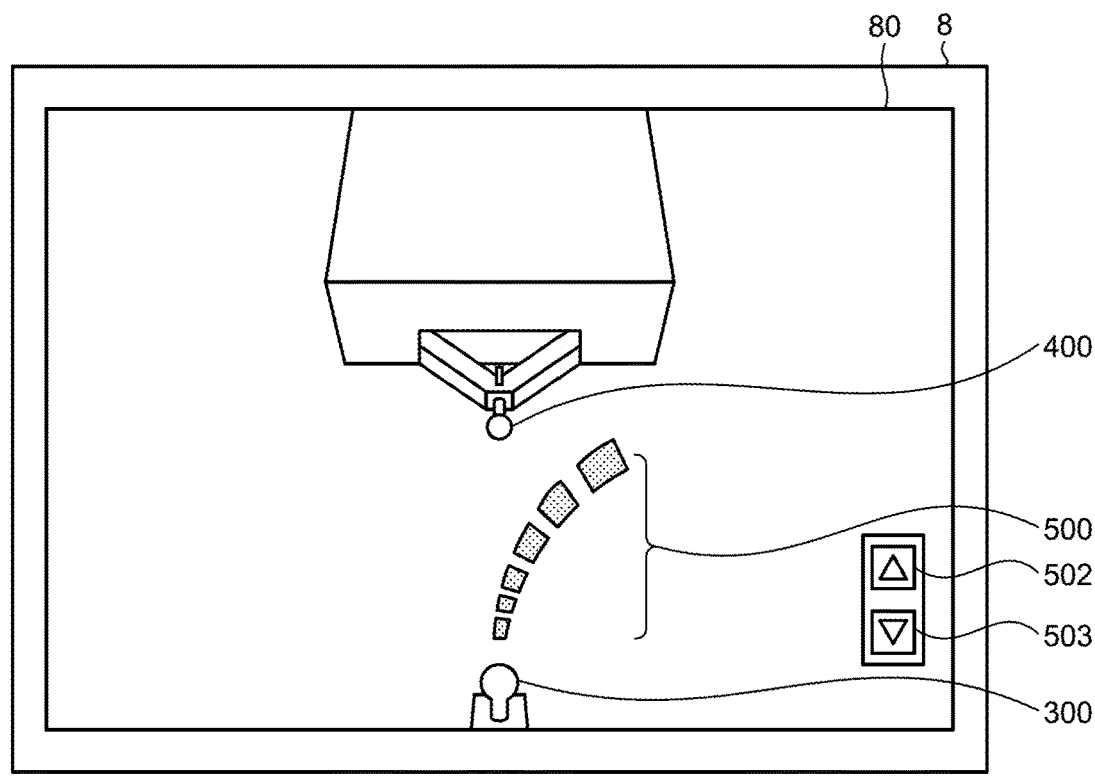
FIG. 13 is a diagram illustrating a display example of the peripheral monitoring device according to the first embodiment.

After the acquirer 101 acquires a touch input to the button 502, the output 103 sets a greater rate of change in width. That is, as illustrated in FIG. 13, the output 103 displays a trajectory image 500 at a greater rate of change in width from the vehicle-1 side end to the opposite end of the trajectory image 500 than the trajectory image 500 in FIG. 12.

Figure 14:
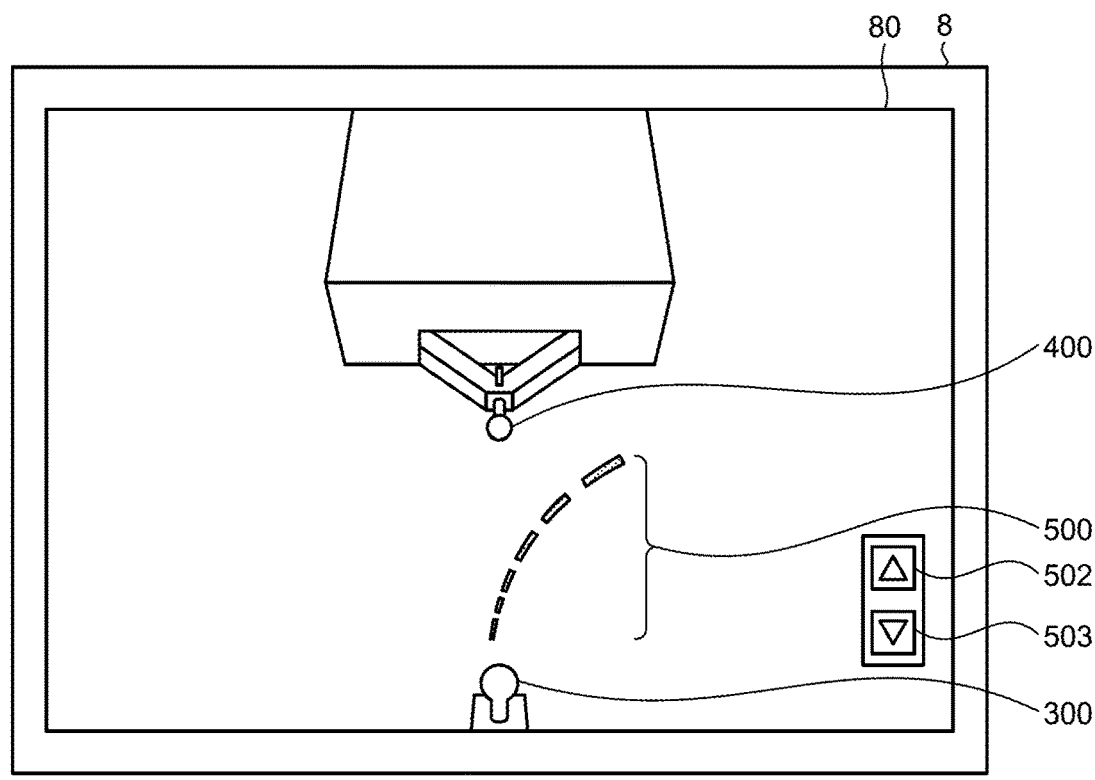
FIG. 14 is a diagram illustrating a display example of the peripheral monitoring device according to the first embodiment.

After the acquirer 101 acquires a touch input to the button 503, the output 103 sets a smaller rate of change in width. That is, as illustrated in FIG. 14, the output 103 displays a trajectory image 500 at a smaller rate of change in width from the vehicle-1 side end to the opposite end of the trajectory image 500 than the trajectory image 500 in FIG. 12.

The method of inputting the width information is not limited thereto. For example, the output 103 may display a setting screen at any timing, and the ECU 14 as the peripheral monitoring device may receive the width information through the setting screen. The ECU 14 as the peripheral monitoring device may receive the width information by audio or through other operation inputs.

In this regard, the driver can set the rate of change in the width in accordance with his or her preference or driving skills.

Second Embodiment

The output 103 may change the display mode of the trajectory image 500 in accordance with the distance between the vehicle 1 and the trailer 200 (hereinafter, referred to as inter-vehicle distance).

Figure 15:
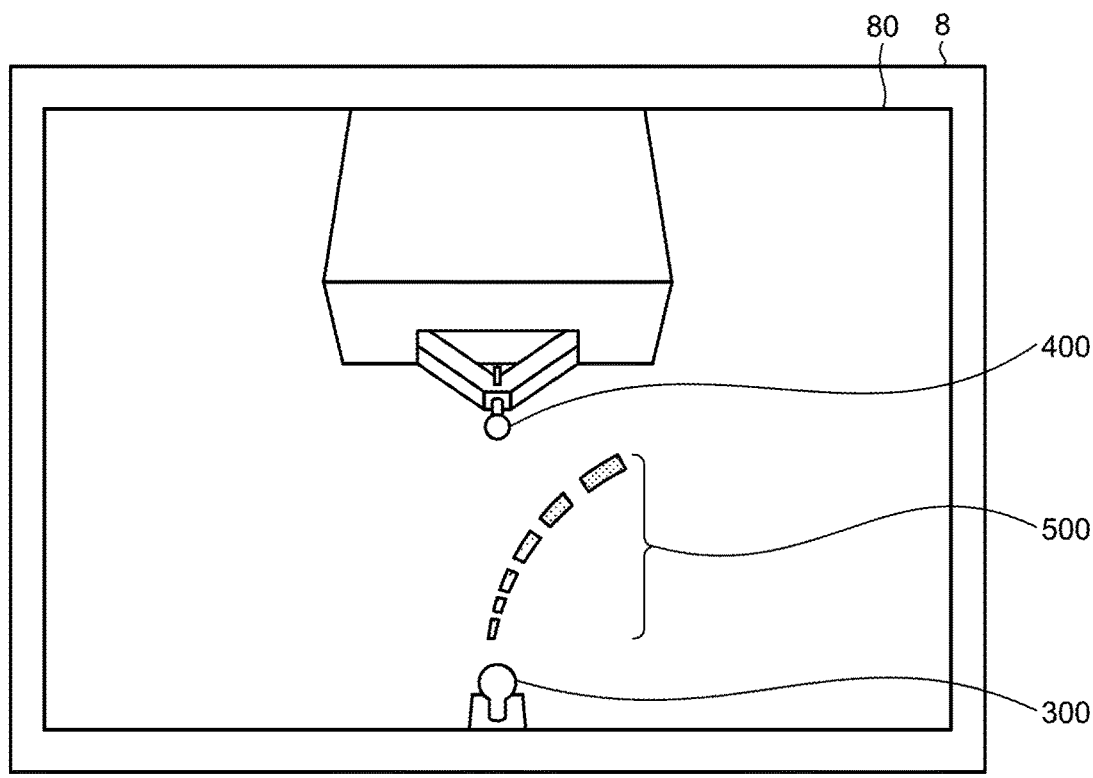
FIG. 15 is a diagram illustrating a display example of a peripheral monitoring device according to a second embodiment of the present invention.

When, for example, the inter-vehicle distance is larger than a threshold Dth, the output 103 decreases the transparency of the trajectory image 500 toward the end as is away from the vehicle-1-side end, as illustrated in FIG. 15. The threshold Dth is set in advance. The threshold Dth is, for example, one meter. The transparency may be changed continuously or in stages.

Figure 16:
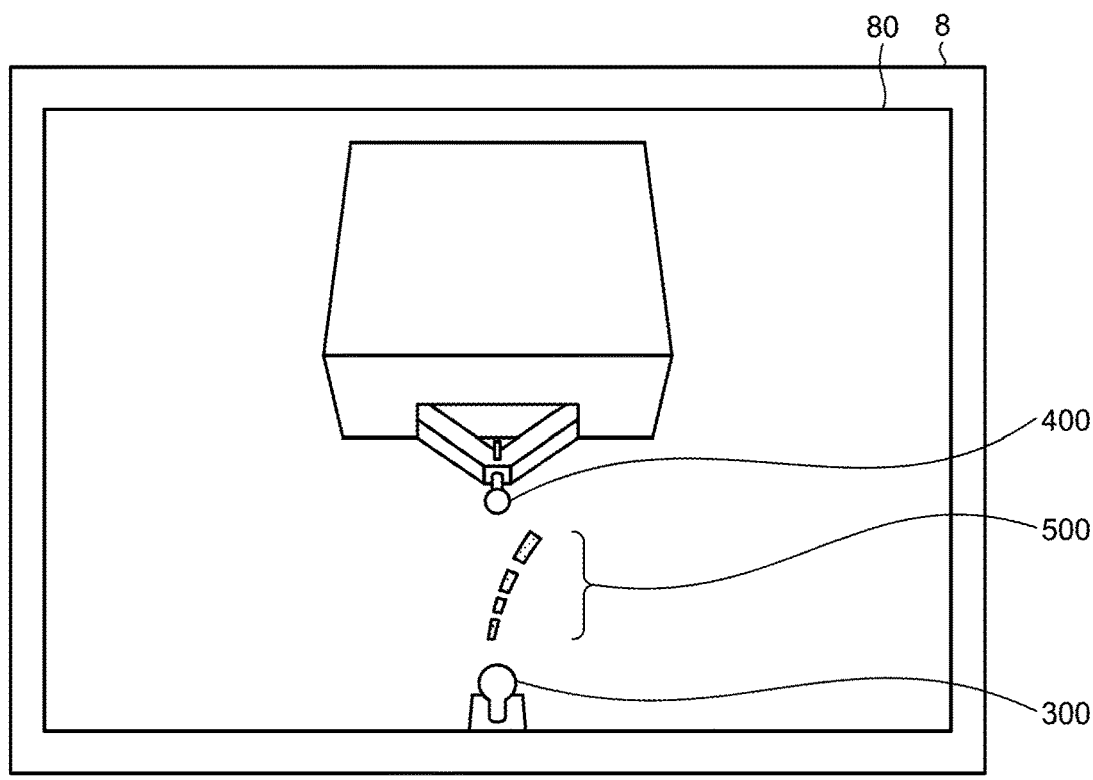
FIG. 16 is a diagram illustrating a display example of the peripheral monitoring device according to the second embodiment.

When the inter-vehicle distance is smaller than the threshold Dth, the output 103 equally sets the transparency of the entire trajectory image 500 as illustrated in FIG. 16. For example, the output 103 may equally set the transparency of the entire trajectory image 500 to neither 0 nor 100% but to a sufficiently large value. In this case, the image 300 of the hitch ball 16 and the image 400 of the hitch coupler 201 can be more viewable while the estimated trajectory is being displayed.

The acquirer 101 acquires the inter-vehicle distance in addition to the images and the steering information. Any method can be adopted to measure the inter-vehicle distance.

For one example, a distance measuring device such as a clearance sonar, a laser range finder, or a stereo camera is mounted on the rear of the vehicle 1 and the acquirer 101 acquires the inter-vehicle distance from the distance measuring device. In another example, the acquirer 101 calculates the inter-vehicle distance from the rear image acquired from the camera 15a by a motion stereo method.

Figure 17:
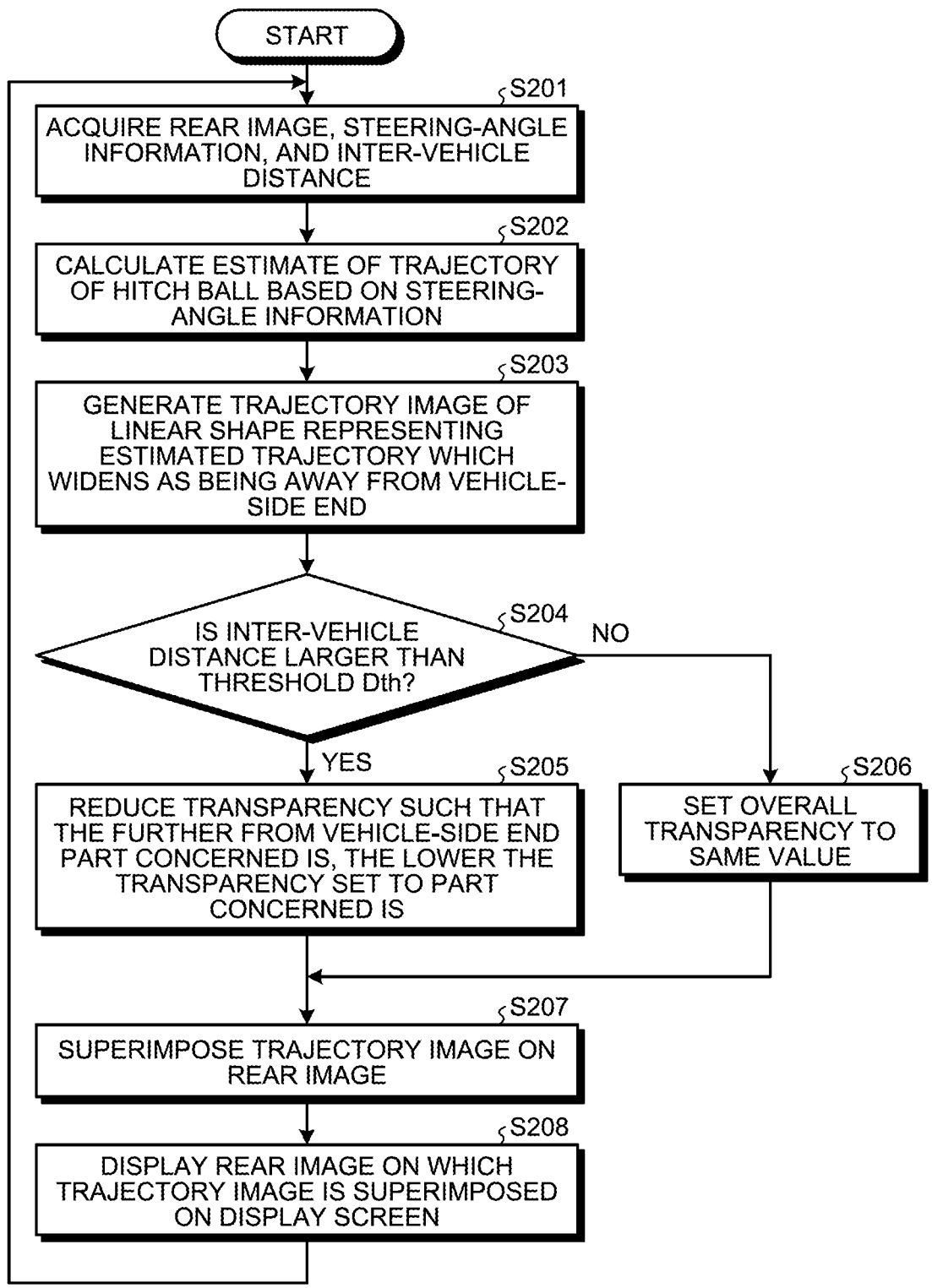
FIG. 17 is a flowchart illustrating the operation of the peripheral monitoring device according to the second embodiment.

FIG. 17 is a flowchart illustrating the operation of the ECU 14 as the peripheral monitoring device according to the second embodiment. The operations from S201 to S208 are a loop operation and are repeated at a certain control cycle.

First, the ECU 14 acquires a rear image, steering-angle information, and an inter-vehicle distance (S201). The calculator 102 calculates an estimate of trajectory of the hitch ball 16 in accordance with the steering-angle information in the same manner as in the first embodiment (S202). The output 103 generates a trajectory image 500 representing the estimated trajectory in the same manner as in the first embodiment (S203). The trajectory image 500 widens as is away from the vehicle-1-side end.

The output 103 determines whether the inter-vehicle distance is larger than the threshold Dth (S204). After determining that the inter-vehicle distance is larger than the threshold Dth (Yes at S204), the output 103 decreases the transparency of the trajectory image 500 toward the end as is away from the vehicle-1-side end (S205). After determining that the inter-vehicle distance is not larger than the threshold Dth (No at S204), the output 103 sets the transparency of the overall trajectory image 500 at the same value (S206).

Herein, the ECU 14 performs the operation at S206 when the inter-vehicle distance is equal to the threshold Dth. However, the operation to be performed when the inter-vehicle distance matches the threshold Dth is not limited thereto. The operation at S205 may optionally be performed when the inter-vehicle distance is equal to the threshold Dth.

After the operation at S205 or S206, the output 103 superimposes the trajectory image 500 on the rear image (S207), and displays the rear image on which the trajectory image 500 is superimposed on the display screen 8 (S208). After S208, the control returns to S201.

As described above, according to the second embodiment, the acquirer 101 further acquires the inter-vehicle distance. If the inter-vehicle distance is larger than the threshold Dth, the output 103 decreases the transparency of the trajectory image 500 continuously or in stages as is away from the vehicle-1-side end. If the inter-vehicle distance is smaller than the threshold Dth, the output 103 equally sets the transparency of the entire trajectory image 500.

Thus, the driver can overlay the trajectory image 500 and the image 400 of the hitch coupler 201 on each other without accurately steering from a sufficiently long distance between the vehicle 1 and the trailer 200, in the same manner as in the first embodiment. This can reduce the driver's load. In a close distance between the vehicle 1 and the trailer 200, the transparency of the entire trajectory image 500 is equally set to a sufficiently large value. This can improve the visibility of the image 300 of the hitch ball 16 and the image 400 of the hitch coupler 201, results in facilitating the position adjustment of the hitch ball 16 and the hitch coupler 201.

The above embodiment has described the example of changing the setting of the transparency in accordance with the inter-vehicle distance. However, the changing method of the display mode of the trajectory image 500 is not limited to this example.

For example, the output 103 may change the rate of change in width in accordance with the inter-vehicle distance, instead of the transparency. When the inter-vehicle distance is larger than the threshold Dth, the output 103, for example, widens the trajectory image 500 as is away from the vehicle-1-side end point, in the same manner as in the first embodiment. When the inter-vehicle distance is smaller than the threshold Dth, the output 103 equally sets the width of the entire trajectory image 500. In a close distance between the vehicle 1 and the trailer 200, the width of the entire trajectory image 500 is equally set to a sufficiently small value. This can improve the visibility of the image 300 of the hitch ball 16 and the image 400 of the hitch coupler 201, and facilitates the position adjustment of the hitch ball 16 and the hitch coupler 201. In other words, it is made possible to effectively assist the driver in coupling the vehicle 1 to the trailer 200.

For another example, the output 103 decreases the length of the trajectory image 500 as the inter-vehicle distance decreases. Without unnecessary lines displayed, more viewable presentation of the relationship among the hitch ball 16, the hitch coupler 201, and the estimated trajectory can be provided to the driver.

For still another example, the output 103 controls the length of the trajectory image 500 in accordance with the image 400 of the hitch coupler 201. Specifically, the output 103 refrains from displaying part of the trajectory image 500 away from the image 400 of the hitch coupler 201 with reference to the vehicle-1-side end point. As one example, the output 103 identifies the image 400 of the hitch coupler 201 from the rear image through, for example, image recognition and then tracks the image 400. For another example, the output 103 allows an occupant to touch the position of the image 400 of the hitch coupler 201 on the rear image and identifies the image 400 of the hitch coupler 201 from his or her touch input. The output 103 then tracks the position of the image 400 of the hitch coupler 201 in the rear image. The output 103 generates a trajectory image 500 extending from the image 300 of the hitch ball 16 to the image 400 of the hitch coupler 201, and superimposes the trajectory image 500 on the rear image. Without unnecessary lines displayed, more viewable presentation of the relationship among the hitch ball 16, the hitch coupler 201, and the estimated trajectory can be provided to the driver.

The output 103 may optionally calculate the distance between the hitch coupler 201 and the estimated trajectory and change the display mode of the trajectory image 500 in accordance with the distance. The distance between the hitch coupler 201 and the estimated trajectory may be a distance in a three-dimensional space or a distance in the rear image. The display mode to be changed is, for example, color or brightness. For one example, the output 103 displays the trajectory image 500 in color such that the further the distance from the hitch coupler 201 to the estimated trajectory is, in the redder color the trajectory image 500 is displayed, and such that the closer the distance from the hitch coupler 201 to the estimated trajectory is, in the bluer color the trajectory image 500 is displayed. The output 103 may change the display mode of not the entire trajectory image 500 but only the leading end of the trajectory image 500. In this regard, by focusing on a change in display mode of the trajectory image 500 instead of both the image 400 of the hitch coupler 201 and the trajectory image 500, the driver can control the steering angle so that the trajectory image 500 approaches the image 400 of the hitch coupler 201.

Third Embodiment

The output 103 may optionally superimpose and display identification information on the rear image in addition to the trajectory image 500 according to the first or second embodiment. The identification information indicates a target position of the hitch coupler 201 (hereinafter simply referred to as identification information).

Figure 18:
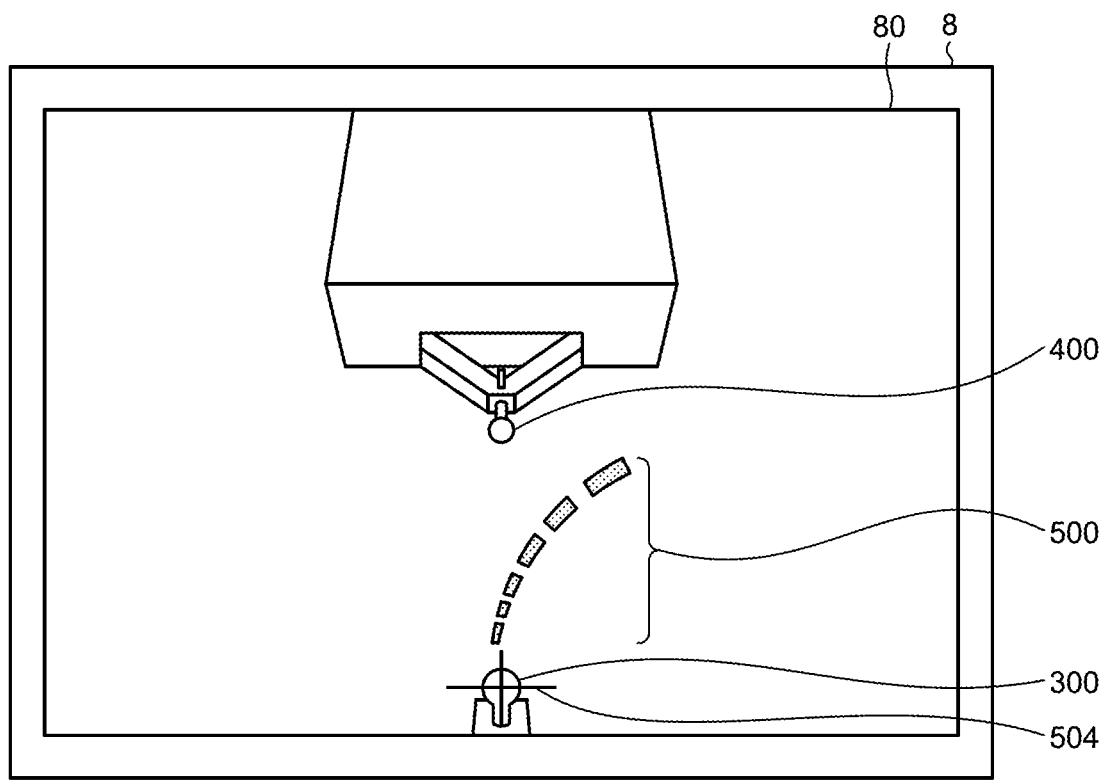
FIG. 18 is a diagram illustrating a display example of a peripheral monitoring device according to a third embodiment of the present invention.

As illustrated in FIG. 18, the output 103, for example, superimposes identification information 504 on the image 300 of the hitch ball 16. In this example, the identification information 504 is a cross-shaped icon. The output 103 identifies the position of the image 300 of the hitch ball 16 by a certain method. The output 103 may identify the position of the image 300 of the hitch ball 16 through image recognition, or on the basis of an occupant's touch input to the position of the image 300 of the hitch ball 16 or an input of numerical values such as the projecting amount of the hitch ball 16 from the rear of the vehicle 1 and the height from the road surface 800.

Figure 19:
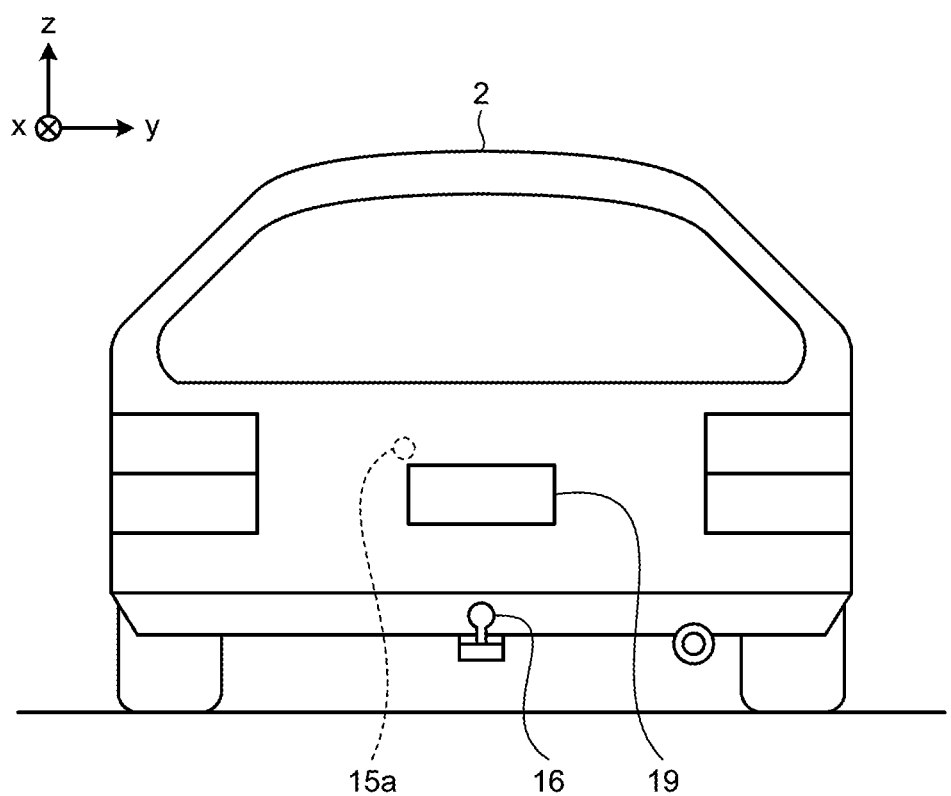
FIG. 19 is a diagram illustrating an exemplary mount position of a camera on a vehicle including the peripheral monitoring device according to the third embodiment.

The hitch ball 16 is disposed at the lateral center of the vehicle 1. However, as illustrated in FIG. 19, the camera 15a may be disposed at a position offset from the lateral center of the vehicle 1. In FIG. 19, the camera 15a is mounted at the upper left of a rear license plate 19.

Figure 20:
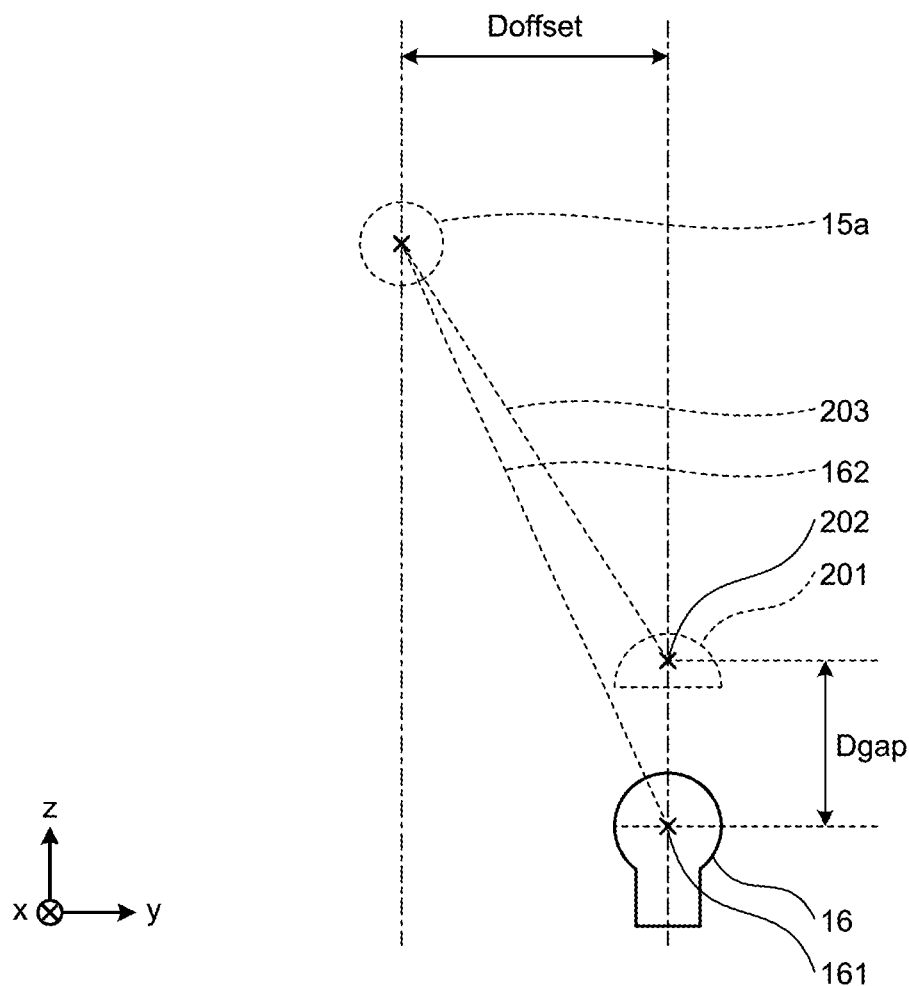
FIG. 20 is a diagram illustrating an exemplary positional among between a camera, a hitch ball, and a target position of a hitch coupler in the vehicle including the peripheral monitoring device according to the third embodiment.

FIG. 20 is a diagram illustrating a positional relationship among the camera 15a, the hitch ball 16, and the target position of the hitch coupler 201. As illustrated in FIG. 20, the camera 15a is disposed at a position offset from the lateral center of the vehicle 1 in the direction, that is, offset from the hitch ball 16 to the left side of the FIG. 20 by Doffset. A target position 202 of the hitch coupler 201 is higher in position than the hitch ball 16 by Dgap. In this case, a line 162 connecting the camera 15a and a center 161 of the hitch ball 16 does not coincide with a line 203 connecting the camera 15a and the target position 202 of the hitch coupler 201. Thus, the target position 202 of the hitch coupler 201 does not match the position of the image 300 showing the hitch ball 16 in the rear image.

Figure 21:
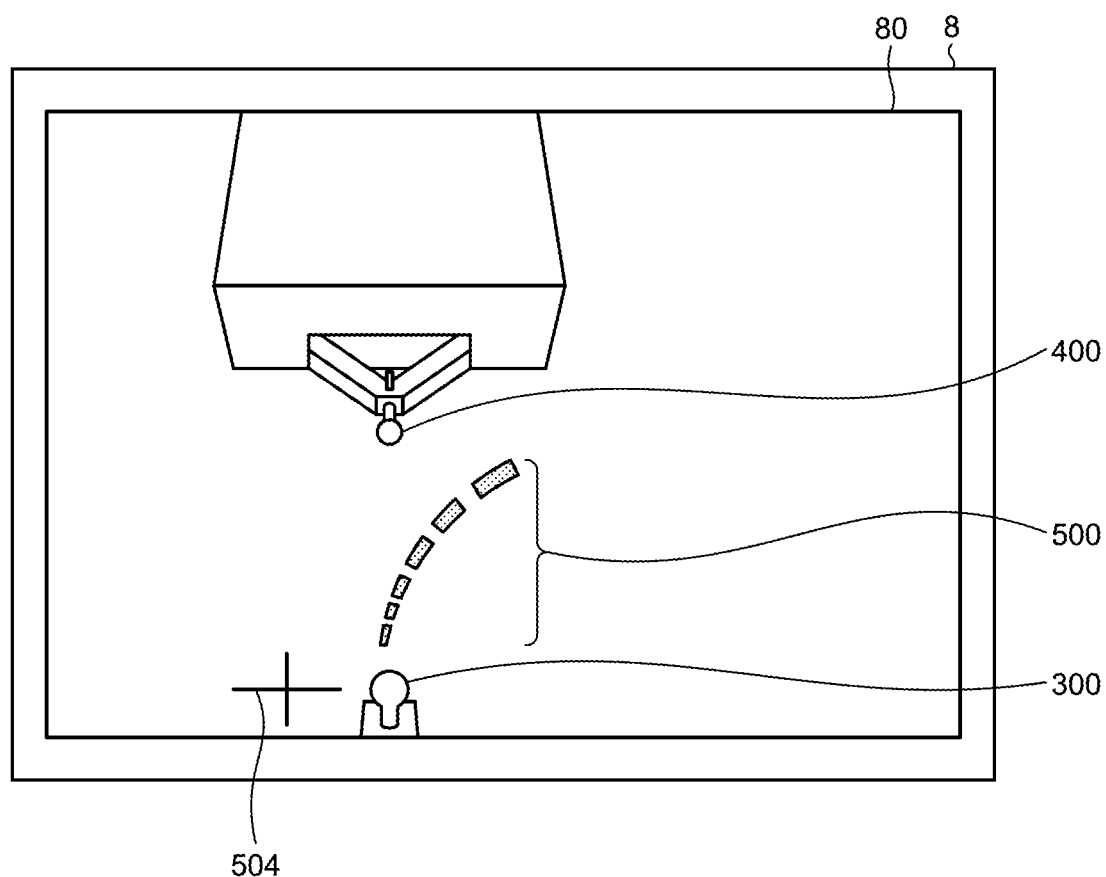
FIG. 21 is a diagram illustrating a display example of the peripheral monitoring device according to the third embodiment.

When the camera 15a is offset in position from the lateral center of the vehicle 1, that is, the hitch ball 16, the output 103 calculates the target position 202 in the three-dimensional space from, for example, Doffset and Dgap, and calculates a display position of the identification information 504 through perspective projection of the target position 202 in the three-dimensional space onto a two-dimensional image as seen from the virtual point of view 702. As illustrated in FIG. 21, the position calculated in this manner is offset from the position of the image 300 of the hitch ball 16 at least in the lateral direction of the display screen 8.

Doffset and Dgap are set by, for example, an input of numerical values. The timing at which Doffset and Dgap are input is not limited to specific timing. Doffset and Dgap may be set at any timing such as during the manufacture or shipping of the vehicle 1, at the time of start of driving, or in coupling operation. For example, a setting screen may be called at any timing and Doffset and Dgap may be input through the setting screen. Optionally, Doffset may be set in advance and Dgap may be set at any timing. Dgap may be fixed to a certain small value (e.g., five centimeters).

According to the third embodiment, as described above, the output 103 superimposes the identification information 504 indicating the target position 202 of the hitch coupler 201 on the rear image and displays the superimposed image on the display screen 8. The identification information 504 indicating the target position 202 is displayed at a position offset at least in the lateral direction of the rear image. Thus, by moving the vehicle 1 so that the identification information 504 is overlaid on the image 400 showing the hitch coupler 201, the driver can more accurately maneuver the vehicle 1 to a position in which the hitch ball 16 and the hitch coupler 201 can be coupled together.

Although certain embodiments of the present invention have been described, the embodiments and modifications above are presented for illustrative purposes only and are not intended to limit the scope of the present invention. The embodiments and modifications above may be embodied in a variety of other forms; furthermore, various omissions, substitutions, combinations, and changes may be made without departing from the spirit of the present invention. Configurations or forms of the embodiments and modifications above may be partially replaced to implement the embodiments and modifications.

The invention claimed is:

1. A peripheral monitoring device comprising:
an acquirer configured to acquire a first image generated by an imaging device, and acquire a steering angle of a vehicle, the imaging device that images an area behind the vehicle;
a calculator configured to calculate an estimate of trajectory of a first coupling device from the steering angle, the first coupling device being mounted on the vehicle to couple the vehicle to a towed vehicle; and
an output configured to display the first image on a display screen for use in an interior of the vehicle and to superimpose a second image on the first image on the display screen, the second image being of a linear shape representing the estimate of trajectory, the linear shape that widens continuously or in stages as being away from a vehicle-side end, wherein
the acquirer further acquires a distance between the vehicle and the towed vehicle,
when the distance is larger than a threshold, the output decreases transparency of the second image continuously or in stages such that the further from the vehicle-side end the second image is, the lower the transparency set to the second image is, and
when the distance is smaller than the threshold, the output sets same transparency at each position of the second image.

2. The peripheral monitoring device according to claim 1, wherein
the output blinks an end of the second image on display, the end being opposite to the vehicle-side end.

3. The peripheral monitoring device according to claim 1, wherein
the imaging device is placed at an offset position from the first coupling device in a lateral direction of the vehicle, and
the output superimposes identification information on the first image on display at an at least laterally offset position from a displayed position of the first coupling device, the identification information indicating a target position of a second coupling device mounted on the towed vehicle.

4. The peripheral monitoring device according to claim 1, wherein
the acquirer further acquires width information input from an occupant, and
the output sets a rate of change in width of the second image in accordance with the width information.

5. A peripheral monitoring device comprising:
an acquirer configured to acquire a first image generated by an imaging device, and acquire a steering angle of a vehicle, the imaging device that images an area behind the vehicle;
a calculator configured to calculate an estimate of trajectory of a first coupling device from the steering angle, the first coupling device being mounted on the vehicle to couple the vehicle to a towed vehicle; and
an output configured to display the first image on a display screen for use in an interior of the vehicle and to superimpose a second image on the first image on the display screen, the second image being of a linear shape representing the estimate of trajectory, the linear shape that widens continuously or in stages as being away from a vehicle-side end, wherein
the imaging device is placed at an offset position from the first coupling device in a lateral direction of the vehicle, and
the output superimposes identification information on the first image on display at an at least laterally offset position from a displayed position of the first coupling device, the identification information indicating a target position of a second coupling device mounted on the towed vehicle.

6. The peripheral monitoring device according to claim 5, wherein
the output blinks an end of the second image on display, the end being opposite to the vehicle-side end.

7. The peripheral monitoring device according to claim 5, wherein
the acquirer further acquires width information input from an occupant, and
the output sets a rate of change in width of the second image in accordance with the width information.

* * * * *